United States Patent
Hans

(10) Patent No.: US 9,870,217 B2
(45) Date of Patent: Jan. 16, 2018

(54) TOOLKIT EVENT CONFIGURATION OF APPLETS ON A CARD COMPUTING DEVICE WITH INSTALLATION PARAMETERS

(71) Applicant: Oracle Deutschland B.V. & Co. KG, Munich (DE)

(72) Inventor: Sebastian J. Hans, Berlin (DE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 106 days.

(21) Appl. No.: 15/064,449

(22) Filed: Mar. 8, 2016

(65) Prior Publication Data
US 2017/0262267 A1 Sep. 14, 2017

(51) Int. Cl.
*G06F 9/445* (2006.01)
(52) U.S. Cl.
CPC ...................................... *G06F 8/61* (2013.01)
(58) Field of Classification Search
None
See application file for complete search history.

(56) References Cited

U.S. PATENT DOCUMENTS

| | | | | |
|---|---|---|---|---|
| 2010/0190437 A1* | 7/2010 | Buhot | ...................... | H04B 5/06 455/41.1 |
| 2013/0311326 A1* | 11/2013 | Lucas | .................... | G06Q 30/06 705/26.8 |
| 2014/0285327 A1* | 9/2014 | Sugibuchi | .............. | G08C 19/00 340/12.22 |
| 2014/0324926 A1* | 10/2014 | Lu | ....................... | G06Q 20/3552 707/824 |
| 2015/0340075 A1* | 11/2015 | Shiga | ........................ | G11C 8/10 713/193 |
| 2016/0142906 A1* | 5/2016 | Park | ...................... | H04W 8/205 455/419 |
| 2017/0017634 A1* | 1/2017 | Levine | ................... | G06F 17/248 |

* cited by examiner

Primary Examiner — Philip Wang
(74) Attorney, Agent, or Firm — Fish IP Law, LLP

(57) ABSTRACT

A method involves registering events. The method may include receiving an install command for an applet by a runtime environment executing on a card computing device. The install command may comprise a tag-length-value (TLV) structure with a tag identifying an event-list for registration with a toolkit registry of the runtime environment. Further, the event-list may comprise a toolkit event. The method may further include executing, by the runtime environment, the install command for the applet. The method may further include creating an applet instance of the applet in response to executing the install command. The method may further include registering the applet instance with the toolkit registry by generating, by the runtime environment, a toolkit registry object for the applet instance. Registering the applet instance with the toolkit registry may further include assigning the toolkit registry object to the applet instance. The method may further include identifying the toolkit event of the event-list based on the tag of the TLV structure of the install command. The method may further include registering the toolkit event of the event-list to the toolkit registry object assigned to the applet instance.

18 Claims, 6 Drawing Sheets

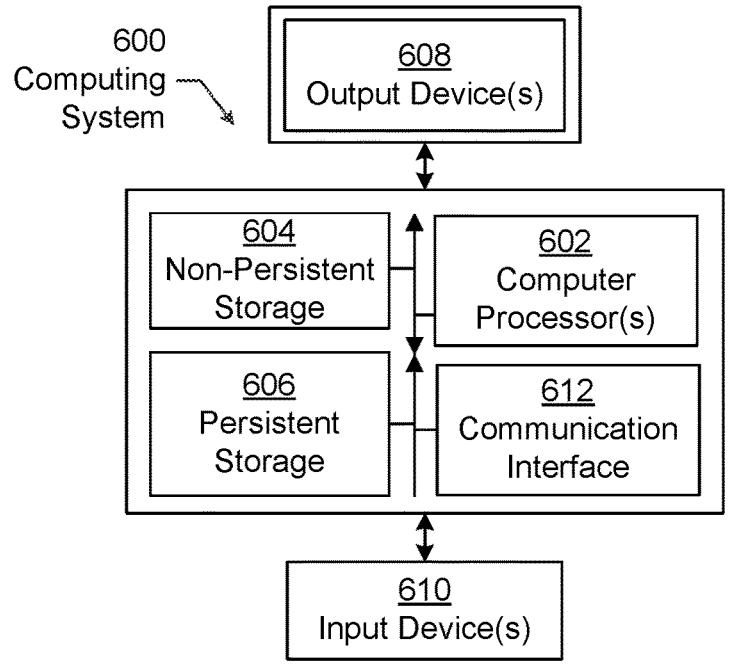
FIG. 6.1
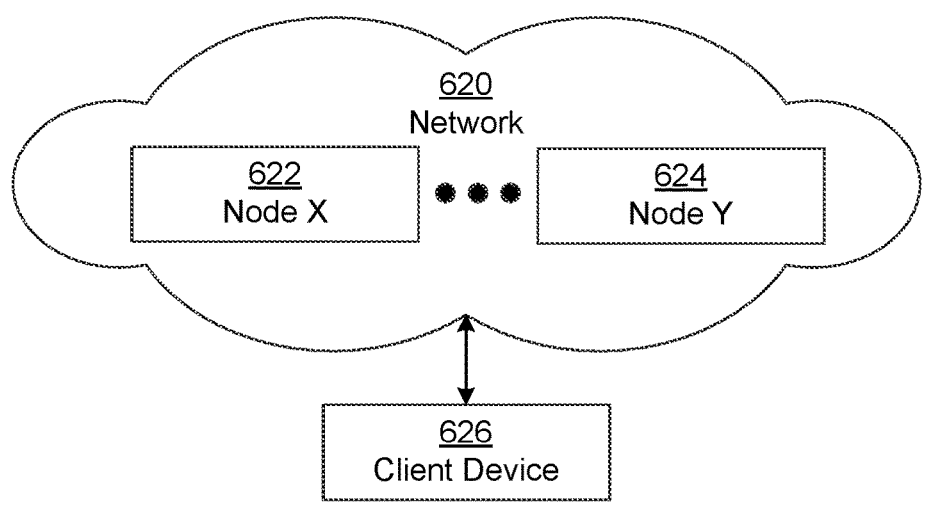
FIG. 6.2

TOOLKIT EVENT CONFIGURATION OF APPLETS ON A CARD COMPUTING DEVICE WITH INSTALLATION PARAMETERS

BACKGROUND

Card computing devices may provide identification, authentication, data storage and application processing in a variety of systems from mobile phones to automated teller machines and drivers licenses. Various specifications and standards define interfaces and protocols for use between card computing devices and card readers, hosts or terminals. For example, the European Telecommunications Standards Institute (ETSI) has defined a set of protocols and specifications relating to application programming interfaces (API) an applet executing on a card computing device may invoke in order to register to toolkit events.

Java has become a common development platform for creating applications for card computing devices. For instance, Java Card™ is a small Java implementation for embedded devices including card computing devices. Many Java Card™ products also rely on the GlobalPlatform Card Specifications for secure management of applications on a card computing device.

SUMMARY

In general, in one aspect, embodiments relate to a method for registering events. The method includes receiving a first install command for an applet by a runtime environment executing on a card computing device. The first install command may comprise a tag-length-value (TLV) structure with a first tag identifying a first event-list for registration with a toolkit registry of the runtime environment. Further, the first event-list may comprise a first toolkit event. The method further includes executing, by the runtime environment, the first install command for the applet. The method further includes creating an applet instance of the applet in response to executing the first install command. The method further includes registering the applet instance with the toolkit registry by generating, by the runtime environment, a toolkit registry object for the applet instance. Registering the applet instance with the toolkit registry may further include assigning the toolkit registry object to the applet instance. The method further includes identifying the first toolkit event of the first event-list based on the first tag of the TLV structure of the first install command. The method further includes registering the first toolkit event of the first event-list to the toolkit registry object assigned to the applet instance.

In general, in one aspect, embodiments relate to a system for registering events. The system includes a processor and a memory executable by the processor. The system further includes a card computing device comprising a runtime environment executing on the processor. The memory includes functionality for receiving a first install command for an applet by a runtime environment executing on a card computing device. The first install command may comprise a tag-length-value (TLV) structure with a first tag identifying a first event-list for registration with a toolkit registry of the runtime environment. Further, the first event-list may comprise a first toolkit event. The memory further includes functionality for executing, by the runtime environment, the first install command for the applet. The memory further includes functionality for creating an applet instance of the applet in response to executing the first install command.

The memory further includes functionality for registering the applet instance with the toolkit registry by generating, by the runtime environment, a toolkit registry object for the applet instance. Registering the applet instance with the toolkit registry may further include assigning the toolkit registry object to the applet instance. The memory further includes functionality for identifying the first toolkit event of the first event-list based on the first tag of the TLV structure of the first install command. The memory further includes functionality for registering the first toolkit event of the first event-list to the toolkit registry object assigned to the applet instance.

Other aspects may be apparent from the following description and the appended claims.

BRIEF DESCRIPTION OF DRAWINGS

FIGS. 6.1 and 6.2 show a computing system in accordance with one or more embodiments disclosed herein.

DETAILED DESCRIPTION

Figure 1:
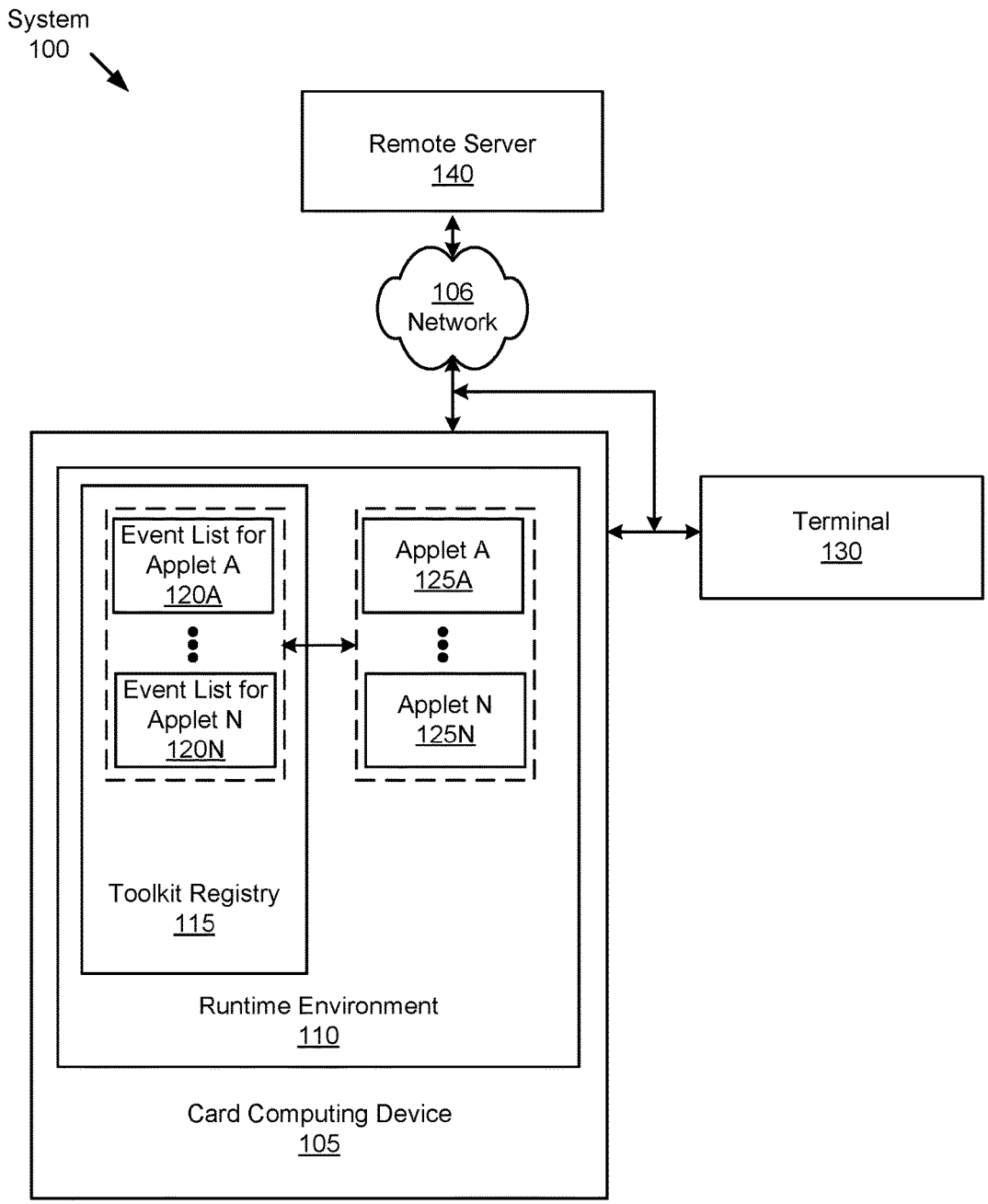
FIG. 1 shows a system in accordance with one or more embodiments disclosed herein.

Specific embodiments disclosed herein will now be described in detail with reference to the accompanying figures. Like elements in the various figures are denoted by like reference numerals for consistency.

In the following detailed description of embodiments disclosed herein, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments include a method and a system for registering events on a smart card. Specifically, embodiments disclosed herein are directed to registering an applet by sending the events the applet instance has to handle to the runtime environment as part of the installation parameters. In particular, one or more embodiments are directed to receiving, by a runtime environment executing on a card computing device, a first install command for an applet. The first install command may comprise a tag-length-value (TLV) structure with a first tag identifying a first event-list for registration with a toolkit registry of the runtime environment. The first event-list may comprise a first toolkit event. Further, one or more embodiments are directed to executing, by the runtime environment, the first install command for the applet. Additionally, one or more embodiments are directed to creating, in response to executing the first install command, an applet instance of the applet. Also, one or more embodiments are directed to registering the applet instance with the toolkit registry by generating, by the runtime environment, a toolkit registry object for the applet instance and assigning the toolkit registry object to the applet instance. Further, one or more embodiments are directed to identifying, based on the first tag of the TLV structure of the first install command, the first toolkit event of the first event-list. Furthermore, one or more embodiments are directed to registering the first toolkit event of the first event-list to the toolkit registry object assigned to the applet instance.

FIG. 1 shows a schematic diagram of a system in accordance with one or more embodiments. While FIG. 1 shows a configuration of components, other configurations may be used without departing from the scope of this disclosure. For example, various components may be combined to create a single component. As another example, the functionality performed by a single component may be performed by two or more components.

Turning to FIG. 1, in accordance with one or more embodiments disclosed herein, the system (100) may include one or more card computing devices (105) and one or more terminals (130) operatively connected to the card computing devices. In one or more embodiments, the card computing device (105) includes various modules, such as runtime environment (110), one or more applications (e.g., applet A (125A), applet N (125N)), a toolkit registry (115), and event lists (e.g., event list for applet A (120A), event list for applet N (120N)). The modules may be a combination of hardware and/or software within the card computing device (105). Furthermore, the modules may not be distinct hardware and/or software, and various functionality performed by the card computing device (105) and/or terminal (130) may encompass one or more of the modules. The modules of the system may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate modules running on a device, as well as any combination of these modules within a given embodiment.

As described herein, a card computing device (105) may refer to any of various types of pocket-sized cards with embedded integrated circuits, including, but not limited to a smart card, a chip card, an integrated circuit card (ICC), or a universal integrated circuit cards (UICC). A card computing device (105) may be configured for use in various roles in any of various systems, such as to provide identification, authentication, data storage and/or application processing. Card computing devices (105) may also provide strong security authentication for single sign-on (SSO) within large organizations. In various embodiments, card computing devices may include (but not be limited to) credit cards, automated teller machine (ATM) cards, mobile phone subscriber identity module (SIM) cards, drivers licenses, authorization cards for pay television, pre-payment cards, high-security identification cards, access control cards and telephone call payment cards. In additional a card computing device may be configured for use as an electronic wallet, such as by recording and managing one or more financial accounts.

In one or more embodiments, the card computing device (105) of FIG. 1 is provided to the user by a card computing device manufacturer, and/or a mobile network operator (MNO). The card computing device (105) may be embedded in the terminal (130). Further, the security module card may be removable from the terminal (130). In one or more embodiments, the security module card is removable by either removing a cover of the terminal (130) or pulling out the security module card with or without the removal of screws or other non-permanent fixation mechanism. In one or more embodiments, the security module card is capable of and intended to be removed by a user from the terminal (130) without damaging the terminal (130) in order to allow the user to easily switch to a different mobile device.

The card computing device (105) may be configured to store and execute one or more applications (e.g., applet A (125A), applet N (125N)), via an operating system or runtime environment (110). For example, in one embodiment, a card computing device may be configured to store and execute a Java based runtime environment and Java applets, such as according to the Java Card™ specifications.

As used herein, Java Card™ may refer to technology that allows Java-based applications (e.g., applets) to be run securely on a card computing device. In some embodiments, a Java Card™ based card computing device may include a combination of a virtual machine (e.g., Java Card™ Virtual Machine or Java Card™ VM) and a runtime library as well as one or more applets. In some embodiments, a card computing device may be configured to execute a Java Card™ Runtime Environment (JCRE) with one or more Java applets.

Terminal (130) may be a personal computer (PC), personal digital assistant (PDA), mobile phone, smartphone, mobile internet device (MID), ultra-mobile personal computer (UMPC), laptop, nettop, netbook, tablet, home theatre personal computer (HTPC), handheld computer, GPS navigation device, automobile computer system, a Mobile Information Device Profile (MIDP) compatible device, a Connected Limited Device Configuration (CLDC) compatible device, and/or any other computing device capable of executing an application. In one or more embodiments, the terminal (130) is operated by a user. Specifically, a user may control the terminal (130). A user may be any individual or group of individuals that may access and select features on the terminal (130). In alternative or additional embodiments, the terminal (130) may be operated and controlled by another machine. In such embodiments, the terminal (130) may act without user interaction and communicate only with machines or a backend system, such as remote server (140).

The system (100) may include one or more Internet of Things (IoT) devices (e.g., card computing device (105), terminal (130), remote server (140)), where IoT may refer to any device or technology enabling the connection of people and machines to the Internet. More specifically, an IoT device may be any device that includes sensors and/or actuators, is connected to a network, and is unattended. Also, IoT may refer to the network of physical objects, devices, vehicles, buildings and other items which are embedded with electronics, software, sensors, and network connectivity, which enables these objects to collect and exchange data. Further, the system (100) may include one or more machine to machine (M2M) devices (e.g., card computing device (105), terminal (130), remote server (140)), where M2M may refer to direct communication between devices using any communications channel, including wired and wireless, such as via an IoT device.

As shown in FIG. 1, card computing device (105) may be configured to communicate over a terminal interface with the terminal (130) and/or one or more applications (not shown) executing on the terminal. Alternatively or in addition, card computing device (105) may be configured to communicate with external devices and services, such as the terminal (130), via any of various card-reading mechanisms, devices and/or interfaces. For example, in some embodiments, card computing device (105) may include one or more contact pads that may be used as a communications medium between the card computing device and a host or terminal for the card computing device. In other embodiments, a card computing device may be a contactless card computing device configured to communicate with a terminal via radio waves, such as via blue tooth, near field communications link, etc. Furthermore, the communications between the card computing device (105) and the terminal (130) may be by wired connection, such as some form of bus (e.g. USB).

When communicating with a host or terminal, a card computing device may be configured to use any of various communications protocols, according to various embodiments. For example, in one embodiment, card computing device (105) may be configured to use the ISO/IEC 7816 communications standard and to exchange pairs of application protocol data unit (APDU) messages with the terminal (130) and/or one or more applications executing on the terminal. Card computing device (105) may receive command APDUs from terminal (130) while sending response APDUs in return. APDUs may include various fields. For example, a command APDU may include a header and from 0-255 bytes of data while a response APDU may include a status word and from 0-255 bytes of data, according to some embodiments.

Additionally, in some embodiments, messages (e.g., ADPUs) exchanged between a card computing device and a terminal may be used within other communications protocols. For example, the European Telecommunications Standards Institute (ETSI) has defined a secure channel mechanism to communicate between an application on a card computing device and a terminal application where the command and responses (command APDU and Response APDU according to ISO 7816) may be encapsulated within dedicated transaction commands. Thus, in some embodiments, the ETSI protocol may be supported by a runtime component of the card computing device. The text "ETSI Technical Specification 102 226—Smart Cards; Remote APDU structure for UICC based applications" is hereby incorporated by reference.

In one or more embodiments, the remote server (140) is one or more computing devices that include functionality to generate and/or deploy one or more applets. The remote server (140) may be implemented as a management server for managing card computing devices (105) and/or terminals (130). Specifically, the remote server (140) may be configured to manage applications and firmware on card computing devices (105) and/or terminals (130). In one or more embodiments, the remote server (140) is managed by a service provider (not shown), such as an MNO. In one or more embodiments, the service provider may be a MNO providing mobile network services to the card computing device (105) and/or terminal (130). In alternative or additional embodiments, the remote server (140) may be independent of the MNO.

Specifically, the remote server (140) is configured to generate and deploy applet packages to the card computing device (105) for installation of one or more applets (e.g., applet A (125A), applet N (125N)). Further, after deploying an applet package to the card computing device (105), the remote server (140) may deliver one or more commands to the card computing device (105) for configuration of an applet (e.g., applet A (125A), applet N (125N)) and/or the card computing device (105). For example, the remote server (140) may deliver an install command to a card computing device for installation of an applet on the card computing device. In another example, the remote server (140) may deliver a store data command and/or an install command to a card computing device for reconfiguration of an applet previously installed on the card computing device. One of ordinary skill in the art would appreciate commands that are implemented by the card computing device are as disclosed in the text "GlobalPlatform Card Specification v2.2.1", which is incorporated by reference in its entirety herein.

In one or more embodiments, the toolkit registry (115) is a data structure that stores a reference to an instance of an applet object of an applet. Further, applets (e.g., applet A (125A), applet N (125N)) register their configuration, such as supported events, with the toolkit registry during the install phase and/or reconfiguration phase of the applets. The event-lists (e.g., event list for applet A (120A), event list for applet N (120N)) consist of all the events that are registered to the applets (e.g., applet A (125A), applet N (125N)) with the runtime environment (110) of the card computing device (105). In one or more embodiments, applets are able to add and/or delete registered events (e.g., event list for applet A (120A), event list for applet N (120N)) within the toolkit registry (115) during an applet's life time. In one or more embodiments, an applet instance is identified within a runtime environment by its application identifier (AID).

In one or more embodiments, an AID, defined by ISO 7816, is a string used to uniquely identify card applications and certain types of files in card file systems. An AID consists of two distinct pieces: a 5-byte RID (resource identifier) and a 0 to 11-byte PIX (proprietary identifier extension). The RID may be a resource identifier assigned to companies by ISO. The PIX identifiers may be assigned by companies. A unique AID may be assigned for each package. In addition, a unique AID may be assigned for each applet in the package.

In accordance with one or more embodiments, the commands received by the card computing device (105) may be in a tag-length-value (TLV) structured format. TLV may refer to the structure of information encoded within a command, and data within a TLV structure of the command may be stored in a trio of fields: a tag field, a length field, and a value field. The data within the fields may be a binary and/or alphanumeric code identifying various system specific parameters and/or application specific parameters. The tag field of a TLV structure may describe a type of data present in the value field. The length of a TLV structure may specify the length of the value field, for example, in bytes. The value field of a TLV structure may contain data representing the value for the data type indicated by the tag field. For example, when present in an install command, the information contained in tag 'C9' (length+data) shall be passed to the applet being installed. In another example, the presence of tags 'C7' or 'C8' in an install command indicates the maximum size of card resources allocated to the applet.

Figure 2:
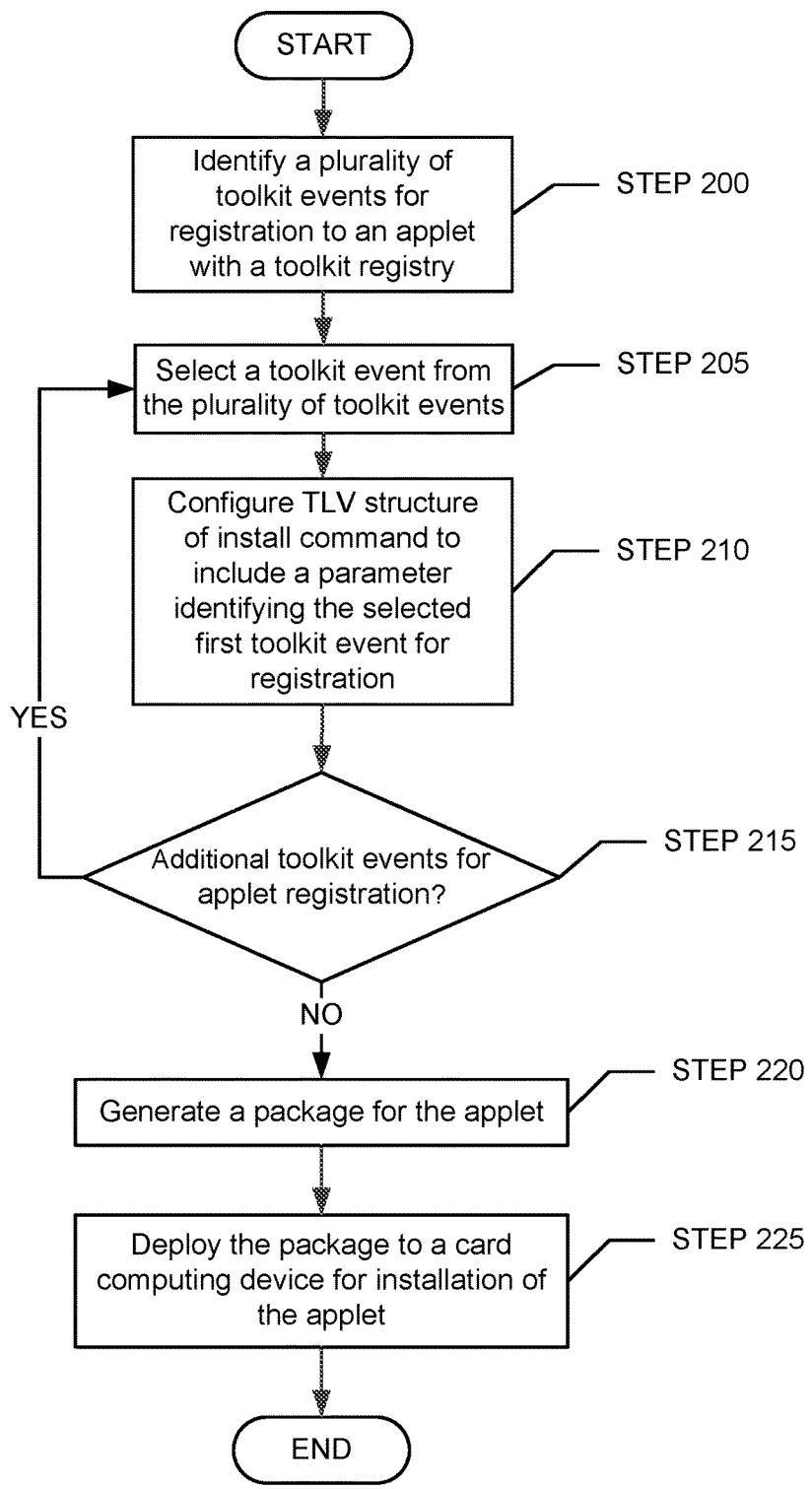
FIGS. 2, 3, and 4 show flowcharts in accordance with one or more embodiments disclosed herein.
Figure 3:
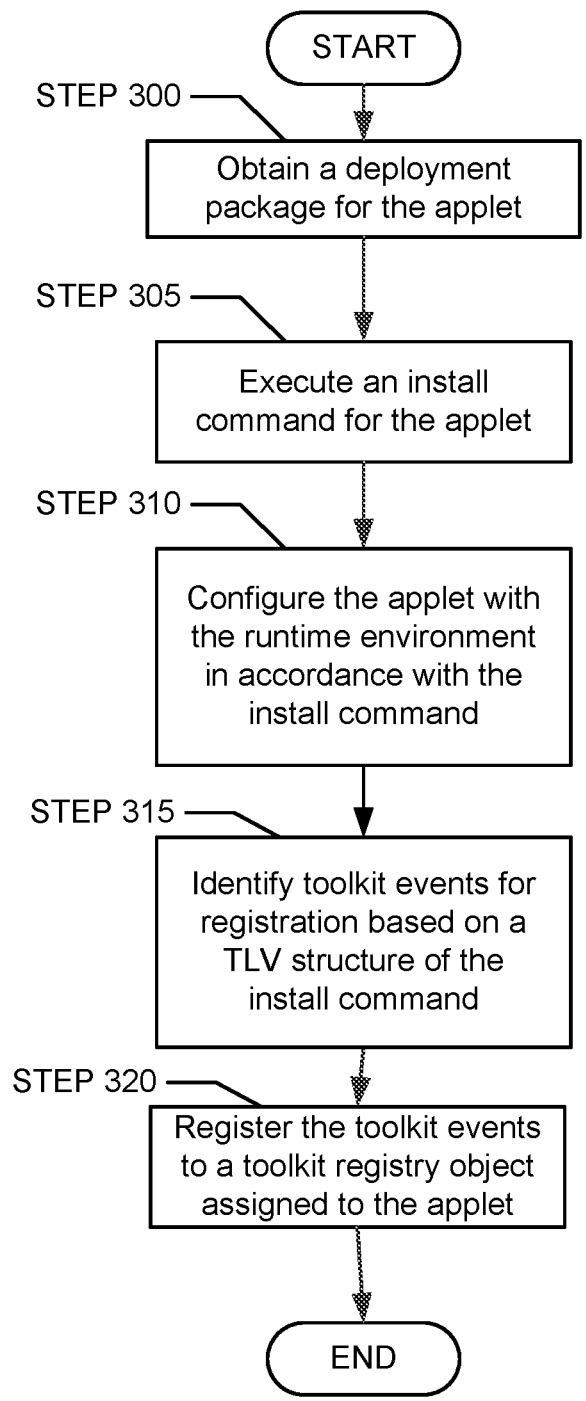
Figure 4:
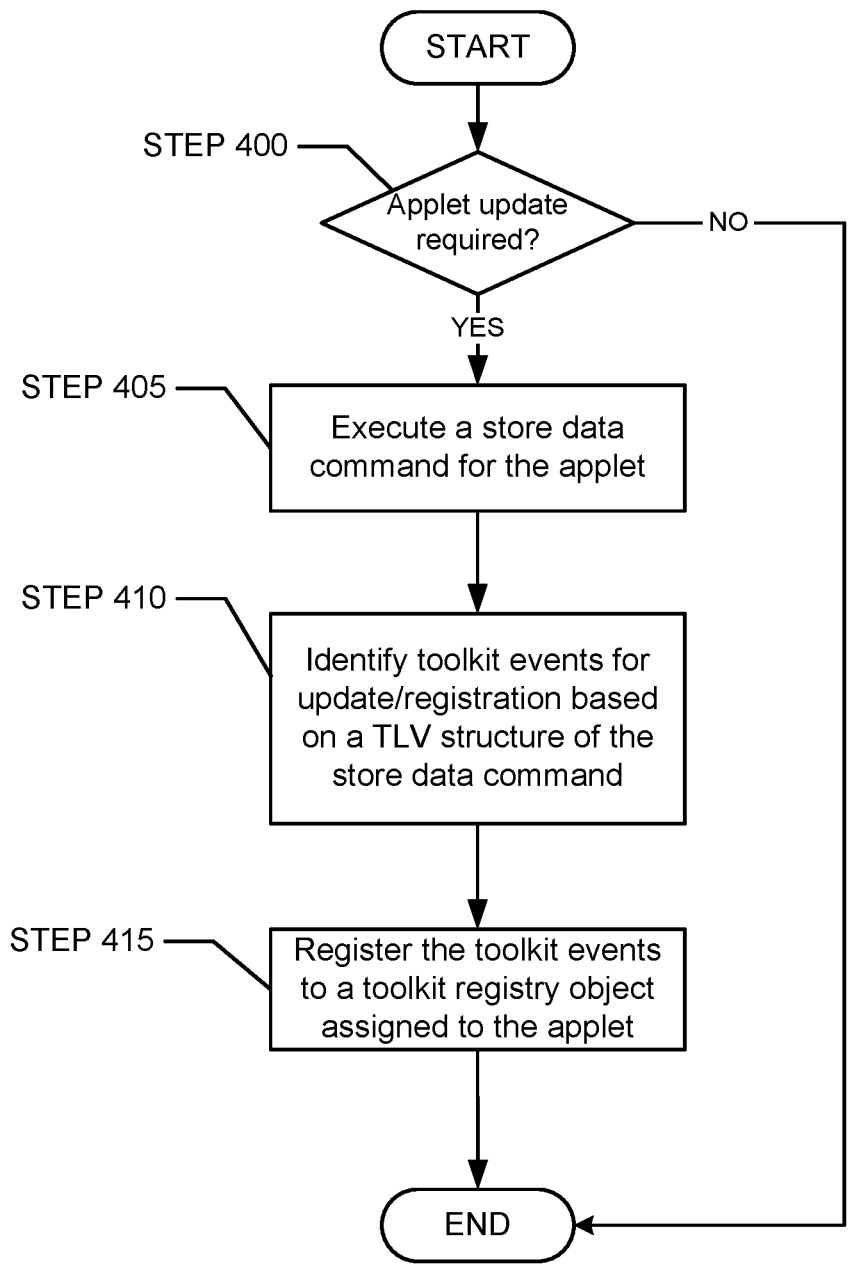

FIGS. 2-4 show flowcharts in accordance with one or more embodiments disclosed herein. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments disclosed herein. As another example, determination steps may be performed by performing a test, such as checking a data value to test whether the value is consistent with the tested condition.

FIG. 2 shows a flowchart describing a method for registering events in accordance with one or more embodiments disclosed herein. Specifically, FIG. 2 shows the preparation process that occurs before the install parameters are provisioned to the card computing device. In other words, FIG. 2 shows the steps that occur to configure the installation of the applet, in one or more embodiments.

In Step 200, a plurality of toolkit events for registration of an applet with a toolkit registry are identified. For example, registration of a multitude of toolkit events to an applet may be desired, and the multitude of toolkit events may be identified by a computer processor of a computing device, such as a remote server, terminal, or card computing device. Each of the multitude of toolkit events may be assigned a particular code that allows for the runtime environment of a card computing device to identify each of the multitude of toolkit events by the TLV structure of a command. For example, the runtime environment of a card computing device may associate a tag value of "9E" with a particular toolkit event. The encoding of data objects, such as the values assigned to the fields of TLV structures, are as disclosed in the text "ETSI TS 101 220 v12.0.0", which is incorporated by reference in its entirety herein.

In Step 205, one toolkit event is selected from the plurality of toolkit events. The processor of the computing device may assign and/or identify one or more TLV field values associated with the selected toolkit event.

In Step 210, the TLV structure of an install command is configured to include the TLV field value for the selected toolkit event identified in Step 205. For example, the processor of the computing device may include a tag value of "9E" that may be associated with the selected toolkit event. The TLV structure of the command may be further configured to include one or more TLV field values instructing the runtime environment executing the command to register the toolkit event identified by the TLV structure with a toolkit registry of the runtime environment.

In Step 215, a determination is made by the processor of the computing device whether additional toolkit events remain in the plurality of toolkit events identified in Step 200 in accordance with one or more embodiments. If no additional toolkit events are identified, then the process proceeds to Step 220. If an additional toolkit event is identified, then the process returns to Step 205 to iteratively select the toolkit event from the plurality of toolkit events.

In Step 220, an applet package for the applet is generated. For example, the processor of the computing device may generate a package for an applet, where the package encapsulates data for installation of the applet on a card computing device. For example, the processor may include the TLV field values corresponding to the toolkit events identified in Step 205 within the package.

In Step 225, to the package is deployed and/or loaded onto a card computing device for installation of the applet. The computing device may be connected to a network that facilitates the exchange of data from one part of the network to another. For example, the network may be a wide area network, a local area network, a public switched telephone network (PSTN), a wireless network capable of transmitting data via a multitude of radio frequencies, or any other suitable network for deploying and/or loading the applet package from the computing device to the card computing device.

FIG. 3 shows a flowchart describing a method for registering events in accordance with one or more embodiments disclosed herein. In Specifically, FIG. 3 describes the process of deploying an applet on a card computing device, after the set up process of FIG. 2 is completed. In step 300, one or more embodiments are directed to obtaining a deployment package for an applet by a card computing device. In one or more embodiments, applets may be deployed at any time during the life cycle of the card computing device. For example, applet packages may be generated, loaded, and/or deployed onto a card computing device by a card issuer at time of manufacture, by a remote server using over-the-air configuration, from a terminal at the point of sale, from a PC, etc.

In Step 305, in accordance with one or more embodiments, an install command is executed by a computer processor of the card computing device. The install command may be received from the same source as the applet package. Alternatively, the install command may be received from a source different from that of the applet package. For example, commands may be received by the card computing device from a device via any of the electromagnetic wave frequencies used for communication and/or a wired or wireless connection with any IoT and/or M2M device.

In Step 310, in one or more embodiments, the computer processor of the card computing device configures the applet with the runtime environment in accordance with the install command. In one or more embodiments, during installation of an applet, an applet instance for the applet is generated by the runtime environment of the card computing device. Next, in accordance with one or more embodiments, the applet instance is registered with a toolkit registry of the runtime environment using the value of the AID assigned to the applet instance. For example, an entry associated with the AID of the applet instance may be inserted within a toolkit registry in the form of a toolkit registry object. An object may be a data structure encapsulated with a set of routines, where the routines may operate on the data.

In Step 315, in accordance with one or more embodiments, an event-list is identified for registration based on the TLV structure of the install command executed in Step 305. In one or more embodiments, the length field of the TLV structure provides the runtime environment with data regarding how many events to register with the toolkit registry. After receiving the command, the runtime environment may parse the TLV structure of the command to determine the toolkit events identified by the tag field. Further, the runtime environment may parse data within the length field and then extract data from the value field of the TLV structure containing data for the toolkit events for registration with the toolkit registry.

In Step 320, after identification of one or more toolkit events based on the TLV structure of the install command, the event-list identified in Step 315 are registered to the toolkit registry object assigned to the applet instance within the toolkit registry. An applet may be triggered in response to an APDU once it is installed and registered to events. For example, following registration of an applet to one or more events with the toolkit registry, the applet may be triggered by the runtime environment in response to activation of one or more events.

In one or more embodiments, the processor of the card computing device may execute one or more determinations in response to identification of the event-list of Step 315. For example, if an applet has an existing registration with a toolkit registry, and a new event-list is provisioned to the card computing device for registration, as described by Steps 300-320, then the processor of the card computing device may execute a determination to compare the toolkit events of the new event-list and the existing registration. In one or more embodiments, if there is any event that is different in the new event-list than from the existing registration of the applet, then the existing registration would be overwritten and substituted with the new event-list.

As a result of the process shown in FIG. 3, a toolkit applet based on the Java Card platform and the toolkit API's defined by ETSI no longer have to invoke a dedicated API to subscribe to the toolkit events it wants to handle. Because software in the card computing device is easier to change then the software in the baseband modem, the card computing device with, for example, a Java Card applet can provide valuable services in an IoT environment. In addition, new events may be defined that should only be handled by a single applet instance (e.g., negotiate poll interval, switch on/off contactless interface, etc.) because it may not be clear if a terminal that hosts the card computing device supports the corresponding features. Accordingly, it may be desirable to implement the handling of such events on the applet level in one single applet instance, so that the runtime environment may be easily adapted to different terminal environments (M2M device, mobile phone with contactless support, etc.).

Further, as a result of the processes of FIGS. 2 and 3, the code that a developer must write in the install method of the applet class is simplified. An example of the code that would be required to be included in the install command for a Java Card Applet class, for example, is shown below.

```
// Create a new applet instance.
Cre_Hin_Erhd_1 thisApplet = new Cre_Hin_Erhd_1( );
// Register the new applet instance to the JCRE
thisApplet.register(bArray, (short)(bOffset+1), bArray[bOffset]);
// Initialise the data of the test applet.
thisApplet.init( );
```

The memory consumption of such an applet is much smaller, having a positive impact on the deployment size and memory consumption in the card computing device. Those skilled in the art would appreciate that the above code is not meant to limit the scope of embodiments disclosed herein to Java applets.

FIG. 4 shows a flowchart describing a method for updating registered events and/or reconfiguring an applet that is already installed in a card computing environment in accordance with one or more embodiments disclosed herein. Specifically, because card computing devices embedded in a M2M or IoT device have a longer lifetime today, updates and/or reconfigurations of the applets installed may be required over the lifetime of the card computing device.

In Step 400, a determination may be made by a processor of the computing device whether an applet installed on a card computing device requires an update and/or reconfiguration. For example, the processor of the card computing device may execute a determination whether an update is required for the applet installed in FIG. 3. In one or more embodiments, if an update for the applet is required, then the process proceeds to Step 405. If an update for the applet is not required, then the process may end.

In Step 405, in accordance with one or more embodiments, a store data command is executed by the computer processor of the card computing device. In one or more embodiments, the store data command is used by the runtime environment to store and/or transfer data associated with an applet. For example, the TLV structure of a store data command received by the card computing device may include a tag identifying an event-list for registration to the applet with the toolkit registry of a runtime environment. The store data command may be received by the card computing device from a device via any of the electromagnetic wave frequencies used for communication and/or a wired or wireless connection with any IoT and/or M2M device. For example, commands may be submitted to a card computing device by a user via a terminal and/or remote server operatively connected to the card computing device.

In Step 410, in accordance with one or more embodiments, an event-list is identified for registration based on the TLV structure of the store data command executed in Step 405. For example, the tag field of the TLV structure of the store data command may include an alphanumeric code identifying one or more toolkit events of an event-list. The processor of the card computing device may parse the TLV structure in order to determine the specific toolkit events identified by the tag field of the TLV structure.

In Step 415, after identification of one or more toolkit events based on the TLV structure of the store data command, the event-list identified in Step 410 are registered to the toolkit registry object assigned to the applet instance within the toolkit registry. For example, the tag field of the TLV structure of the install command may include an alphanumeric code identifying one or more toolkit events of an event-list. The processor of the card computing device may parse the TLV structure in order to determine the specific toolkit events identified by the tag of the TLV structure. In one or more embodiments, toolkit events identified in Step 410 may be registered in tandem with an existing event-list registration to a toolkit registry object assigned to an applet instance. For example, the event-list registered in Step 415 via the store data command may be registered to a toolkit registry object assigned to an applet instance without overwriting an existing event-list registration of the applet instance. In one or more embodiments, the event-list registered in Step 415 may be registered to an applet instance with the toolkit registry in tandem with an existing event-list registration of the applet instance, where the existing event-list may be registered with the toolkit registry using an API defined by ETSI.

Using embodiments described in FIG. 4, install parameters can be sent again to the card computing device to update the registry of the applet, and this can be done with a standardized command, thereby avoiding programming the reconfiguration in the applet code itself.

Figure 5:
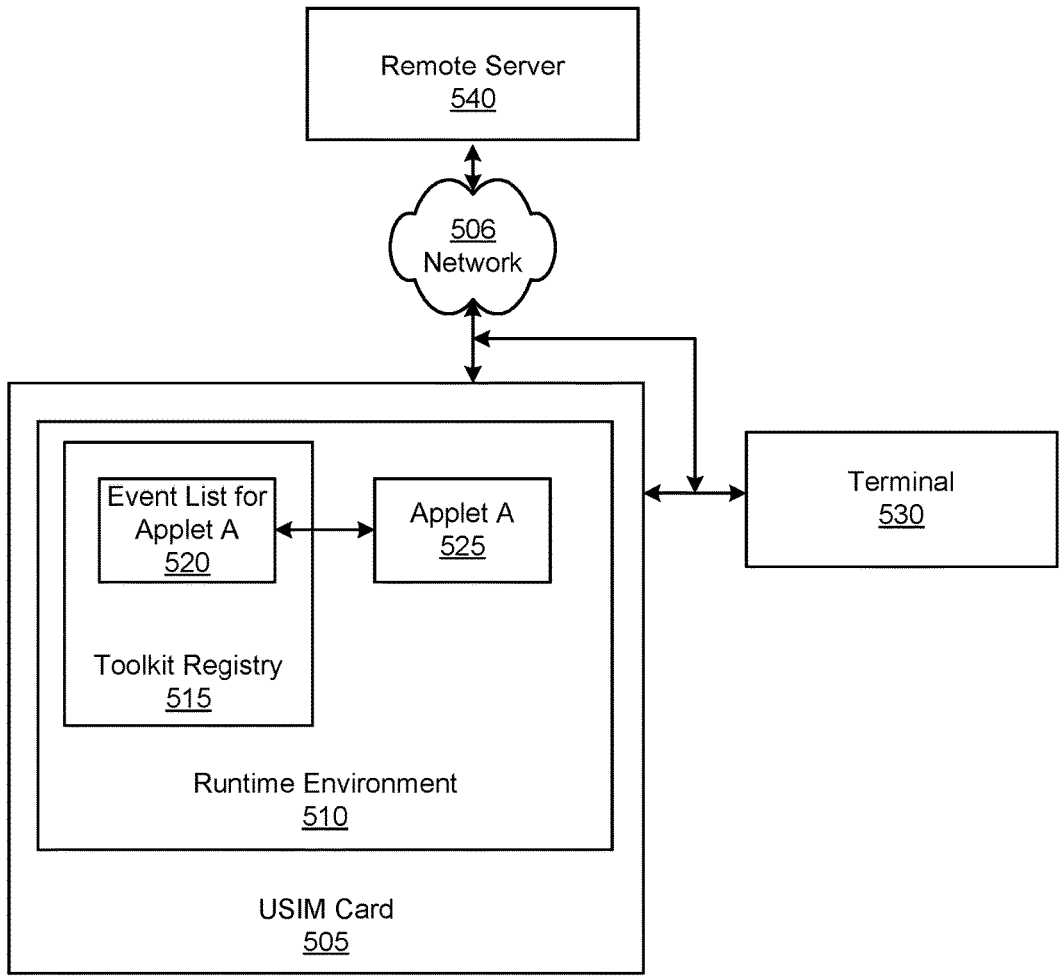
FIG. 5 shows an example in accordance with one or more embodiments disclosed herein.

FIG. 5 shows an example for registering events in accordance with one or more embodiments disclosed herein. The following example is for explanatory purposes only and not intended to limit the scope of this disclosure. For the purposes of the example only, consider the scenario in which a package for an applet (525) is loaded onto an embedded UICC/SIM card (505) by a user. In this scenario, a user may be a card computing device manufacturer, a MNO providing wireless communication services to the card computing device, and/or an user of a terminal operatively connected to the card computing device. The applet (525) may collect and transmit, to the user, data describing usage of the card computing device (505) and/or the terminal (530) operatively connected to the card computing device. For example, the data collected by the applet (525) may describe intra-device communication, such as communication of the applet with a runtime environment (510) executing on the card computing device (505), and/or inter-device wireless/wired communications with one or more IoT devices. The card (505) may be connected to a network (506) that facilitates the exchange of data from one part of the network to another. For example, the network (506) may be a wide area network, a local area network, a public switched telephone network (PSTN), a wireless network capable of transmitting data via a multitude of radio frequencies, or any other suitable network for exchanging data between the card (505) and the remote server (540).

In this example, the terminal (530) is a modem that can communicate via various mobile networks, such as GSM/UMTS/LTE, and the card (505) may be hard-wired into the terminal (530). A user may wish to program the card (505) to periodically transmit the usage data to a remote server (540). Further, the user may wish for the card (505) to use a specific communication channel when transmitting the usage data to the remote server (540), such as only SMS or only LTE. Accordingly, the user may include, within the TLV structure of the install command for the applet (525), a code identifying a SMS toolkit event for registration with a toolkit registry (515). The SMS toolkit event may instruct the card (505) to transmit the usage data collected by the applet (525) via a SMS communication channel.

After the card (505) is integrated into the terminal (530), the user of the remote server (540) may transmit an install command via an over-the-air network communication (506) to the card (505) to initiate installation of the applet package. In response to receiving the install command from the remote server (540), the computer processor of the card (505) executes the install command and configures the applet (525) with the runtime environment (510) in accordance with the install command, such as generating an applet instance for the applet, and registering the applet instance with the toolkit registry (515) of the runtime environment (510). Further, during installation of the applet (525), the runtime environment (510) may parse the TLV structure of the command to determine the toolkit events identified by the tag field. After identification of the SMS toolkit event based on the TLV structure of the install command, the runtime environment (510) may register the SMS toolkit event (520) within the toolkit registry (515). Following execution of the install command, the event-list (520) for the applet (525) may be configured to include the SMS toolkit event.

After configuration of the applet (525) on the card (505), the user of the remote server (540) may wish to change the communication protocol of the card (505) from SMS only to LTE only. Accordingly, the user may include, within the TLV structure of a store data command for the applet (525), a code identifying a LTE toolkit event for registration with the toolkit registry (515). The LTE toolkit event may instruct the card (505) to transmit the usage data collected by the applet (525) via a LTE communication channel. The user may include, within the TLV structure of the store data command, a code instructing the runtime environment (510) to deregister the SMS toolkit event with the toolkit registry (515). Further, in response to execution of the store data command, the runtime environment (510) may overwrite the existing event-list registration with an event-list identified by the TLV structure of the store data command.

The user of the remote server may transmit a store data command via the over-the-air network communication network (506) to the card for reconfiguration of the applet (525). In response to receiving the store data command from the remote server (540), the computer processor of the card (505) executes the store data command and reconfigures the applet (525) with the runtime environment (510) in accordance with the store data command, such as parsing the TLV structure of the store data command to determine the toolkit events identified by the tag field. After identification of the LTE toolkit event based on the TLV structure of the store data command, the runtime environment (510) may register the LTE toolkit event (520) within the toolkit registry (515). Following execution of the store data command, the event-list (520) for the applet (525) may be reconfigured to include the LTE toolkit event.

By adding event registration of an applet to the installation process, the event registration can exist in parallel to the existing API based registration. In this way, embodiments disclosed herein are backward compatible with the existing method, meaning existing applets can still work without any change on a new SIM card that supports the new way of registration of the applet to the runtime environment.

Embodiments disclosed herein may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments disclosed herein may be implemented on a node of a distributed system that is connected to other nodes. By way of another example, embodiments disclosed herein may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626), such as a card computing device (105), terminal (130), and/or remote server (140). For example, the nodes may be part of a cloud computing system. The nodes may include functionality to receive requests from the client device (626) and transmit responses to the client device (626). The client device (626) may be a computing system, such as the computing system shown in FIG. 6.1 and/or the computing system (100) shown in FIG. 1. Further, the card computing device (105), terminal (130), remote server (140), and/or client device (626) may include and/or perform all or a portion of one or more embodiments disclosed herein.

The computing system (100) and/or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases. For example, in accordance with one or more embodiments disclosed herein, a data repository may store an applet, an event-list, applet package, and any data associated with installing, registering, and/or configuring an applet and/or card computing device (105).

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6.1 and the nodes and/or client device in FIG. 6.2. Other functions may be performed using one or more embodiments disclosed herein.

What is claimed is:

1. A method for registering events, comprising:
   receiving, by a runtime environment executing on a card computing device, a first install command for an applet, the first install command comprising a tag-length-value (TLV) structure with a first tag identifying a first event-list for registration with a toolkit registry of the runtime environment,
wherein the first event-list comprises a first toolkit event;
executing, by the runtime environment, the first install command for the applet;
creating, in response to executing the first install command, an applet instance of the applet;
registering the applet instance with the toolkit registry by:
generating, by the runtime environment, a toolkit registry object for the applet instance; and
assigning the toolkit registry object to the applet instance;
identifying, based on the first tag of the TLV structure of the first install command, the first toolkit event of the first event-list; and
registering the first toolkit event of the first event-list to the toolkit registry object assigned to the applet instance.

2. The method of claim 1, further comprising:
receiving, after registering the first event-list with the toolkit registry, a store data command for the applet, the store data command comprising a TLV structure with a second tag identifying a second event-list, and
wherein the second event-list comprises a second toolkit event;
executing, by the runtime environment, the store data command for the applet;
identifying, based on the second tag of the TLV structure of the store data command, the second toolkit event; and
registering the second toolkit event of the second event-list to the toolkit registry object, resulting in registration of the first toolkit event of the first event-list and the second toolkit event of the second event-list to the toolkit registry object.

3. The method of claim 2, further comprising:
receiving a second install command for the applet, the second install command comprising a TLV structure with a third tag identifying a third event-list, and
wherein the third event-list comprises a third toolkit event;
executing, by the runtime environment, the second install command for the applet;
identifying, based on the third tag of the TLV structure of the second install command, the third toolkit event of the third event-list; and
registering the third toolkit event of the third event-list to the toolkit registry object by overwriting, with the third event-list, registration of the first event-list and the second event-list to the toolkit registry object.

4. The method of claim 1, further comprising:
executing a determination, in response to executing the first install command, that the first toolkit event is registered to a different toolkit registry object assigned to a different applet instance within the toolkit registry; and
terminating, in response to the determination, the first install command.

5. The method of claim 1, further comprising:
sending, to a mobile terminal operatively connected to the card computing device, a proactive command comprising the first event-list for the applet;
receiving, from the mobile terminal and after sending the first event-list, a command triggering the first toolkit event; and
activating, in response to triggering of the first toolkit event, the applet using the runtime environment.

6. The method of claim 1, wherein the card computing device is a universal subscriber identity module (USIM) card.

7. The method of claim 1, further comprising:
sending, to a mobile terminal operatively connected to the card computing device, a proactive command comprising the first event-list for the applet;
receiving, from the mobile terminal and after sending the first event-list, a command triggering the first toolkit event; and
activating, in response to triggering of the first toolkit event, the applet using the runtime environment.

8. The method of claim 7, wherein the mobile terminal is one selected from a group consisting of mobile phone, machine-to-machine (M2M) device, and Internet-of-Things (IoT) device.

9. The method of claim 1, wherein the applet comprises a set of Java classes and the card computing device conforms to a JavaCard Platform.

10. A system for registering events, comprising:
a card computing device comprising a runtime environment executing on a processor, the runtime environment being configured to:
receive, by a runtime environment executing on a card computing device, a first install command for an applet, the first install command comprising a tag-length-value (TLV) structure with a first tag identifying a first event-list for registration with a toolkit registry of the runtime environment,
wherein the first event-list comprises a first toolkit event;
execute, by the runtime environment, the first install command for the applet;
create, in response to executing the first install command, an applet instance of the applet; and
register the applet instance with the toolkit registry by:
generating, by the runtime environment, a toolkit registry object for the applet instance; and
assigning the toolkit registry object to the applet instance;
identifying, based on the first tag of the TLV structure of the first install command, the first toolkit event of the first event-list; and
registering the first toolkit event of the first event-list to the toolkit registry object assigned to the applet instance.

11. The system of claim 10, wherein the runtime environment is further configured to:
receive, after registering the first event-list with the toolkit registry, a store data command for the applet, the store data command comprising a TLV structure with a second tag identifying a second event-list, and
wherein the second event-list comprises a second toolkit event;
execute, by the runtime environment, the store data command for the applet;
identify, based on the second tag of the TLV structure of the store data command, the second toolkit event; and
register the second toolkit event of the second event-list to the toolkit registry object, resulting in registration of the first toolkit event of the first event-list and the second toolkit event of the second event-list to the toolkit registry object.

12. The system of claim 11, wherein the runtime environment is further configured to:
  receive a second install command for the applet, the second install command comprising a TLV structure with a third tag identifying a third event-list, and wherein the third event-list comprises a third toolkit event;
  execute, by the runtime environment, the second install command for the applet;
  identify, based on the third tag of the TLV structure of the second install command, the third toolkit event of the third event-list; and
  register the third toolkit event of the third event-list to the toolkit registry object by overwriting, with the third event-list, registration of the first event-list and the second event-list to the toolkit registry object.

13. The system of claim 10, wherein the runtime environment is further configured to:
  execute a determination, in response to executing the first install command, that the first toolkit event is registered to a different toolkit registry object assigned to a different applet instance within the toolkit registry; and
  terminate, in response to the determination, the first install command.

14. The system of claim 12, wherein the runtime environment is configured to receive the first event registration for the applet from a remote server.

15. The system of claim 10, wherein the card computing device is a universal subscriber identity module (USIM) card.

16. The system of claim 10, wherein the runtime environment is further configured to:
  send, to a mobile terminal operatively connected to the card computing device, a proactive command comprising the first event-list for the applet;
  receive, from the mobile terminal and after sending the first event-list, a command triggering the first toolkit event; and
  activate, in response to triggering of the first toolkit event, the applet using the runtime environment.

17. The system of claim 16, wherein the mobile terminal is one selected from a group consisting of mobile phone, machine-to-machine (M2M) device, and Internet-of-Things (IoT) device.

18. The system of claim 1, wherein the applet comprises a set of Java classes and the card computing device conforms to a JavaCard™ Platform.

* * * * *

UNITED STATES PATENT AND TRADEMARK OFFICE
CERTIFICATE OF CORRECTION

PATENT NO. : 9,870,217 B2  
APPLICATION NO. : 15/064449  
DATED : January 16, 2018  
INVENTOR(S) : Hans Page 1 of 1

It is certified that error appears in the above-identified patent and that said Letters Patent is hereby corrected as shown below:

In the Claims

In Column 16, Line 25, in Claim 9, delete "JavaCard Platform." and insert -- JavaCard™ Platform. --, therefor.

In Column 18, Line 3, in Claim 14, delete "claim 12," and insert -- claim 10, --, therefor.

In Column 18, Line 23, in Claim 18, delete "claim 1," and insert -- claim 10, --, therefor.

Signed and Sealed this  
Thirty-first Day of July, 2018

Andrei Iancu  
*Director of the United States Patent and Trademark Office*